(12) United States Patent
Venugopal et al.

(10) Patent No.: US 12,381,889 B2
(45) Date of Patent: Aug. 5, 2025

(54) CLOUD ENVIRONMENT SECURITY TOOL

(71) Applicant: SAP SE, Walldorf (DE)

(72) Inventors: Indu Venugopal, Bangalore (IN); Reena Sethy, Bangalore (IN)

(73) Assignee: SAP SE, Walldorf (DE)

( * ) Notice: Subject to any disclaimer, the term of this patent is extended or adjusted under 35 U.S.C. 154(b) by 760 days.

(21) Appl. No.: 17/539,871

(22) Filed: Dec. 1, 2021

(65) Prior Publication Data

US 2023/0171270 A1 Jun. 1, 2023

(51) Int. Cl.
*H04L 9/40* (2022.01)

(52) U.S. Cl.
CPC ........ *H04L 63/1416* (2013.01); *H04L 63/102* (2013.01); *H04L 63/105* (2013.01); *H04L 63/145* (2013.01); *H04L 63/20* (2013.01)

(58) Field of Classification Search
CPC . H04L 63/1416; H04L 63/102; H04L 63/105; H04L 63/145; H04L 63/20
See application file for complete search history.

(56) References Cited

U.S. PATENT DOCUMENTS

| | | | | |
|---|---|---|---|---|
| 7,607,046 | B1* | 10/2009 | Bruckhaus | G06F 11/008 714/38.14 |
| 9,038,197 | B2* | 5/2015 | Boldyrev | H04W 4/60 726/34 |
| 10,237,297 | B2* | 3/2019 | Lim | G06F 3/04842 |
| 10,819,593 | B1 | 10/2020 | Parthasarathy et al. | |
| 2015/0033337 | A1* | 1/2015 | Baikalov | H04L 63/1408 726/23 |
| 2019/0005423 | A1* | 1/2019 | Pritzkau | G06Q 10/0635 |
| 2021/0279337 | A1 | 9/2021 | Mosby et al. | |

(Continued)

FOREIGN PATENT DOCUMENTS

CA 2998749 C * 3/2021 .......... G06F 11/3688

OTHER PUBLICATIONS

Kaliski Jr, B. S., & Pauley, W. (2010). Toward risk assessment as a service in cloud environments. In 2nd USENIX Workshop on Hot Topics in Cloud Computing (HotCloud 10). Kaliski & Pauley gives an overview of cloud security as a cloud service. (Year: 2010).*

(Continued)

*Primary Examiner* — John B King
(74) *Attorney, Agent, or Firm* — SCHWEGMAN LUNDBERG & WOESSNER, P.A.

(57) ABSTRACT

Various examples are directed to systems and a method for managing security at a public cloud platform deployment. A landscape service may determine a landscape score for an application instance executing at the public cloud platform deployment. An access frequency service may determine an access frequency score for the application instance. A last access service may determine a last access score for the application instance. The public cloud platform deployment may determine a total risk score for the application instance using the landscape score for the application instance, the access frequency score for the application instance, and the last access score for the application instance. Responsive to determining that the total risk score for the application instance is greater than a threshold value, an alert message may be sent to an administrative user account for the public cloud platform deployment.

20 Claims, 10 Drawing Sheets

(56) References Cited

U.S. PATENT DOCUMENTS

| | | | | |
|---|---|---|---|---|
| 2022/0245647 A1* | 8/2022 | Dhawan | ................. | G06N 20/00 |
| 2022/0255959 A1* | 8/2022 | Viswanathan | .......... | G06F 21/60 |
| 2022/0269792 A1* | 8/2022 | Rao | .................... | H04L 63/1466 |
| 2023/0084737 A1* | 3/2023 | Zhang | .................. | H04L 67/535 |
| | | | | 709/224 |

OTHER PUBLICATIONS

Wang, H., Liu, F., Liu, H. (2012). A Method of the Cloud Computing Security Management Risk Assessment. In: Zeng, D. (eds) Advances in Computer Science and Engineering. Advances in Intelligent and Soft Computing, vol. 141. Springer, Berlin, Heidelberg. https://doi.org/10.1007/978-3-642-27948-5_81 (Year: 2012).*

"European Application Serial No. 22186702.1. Extended European Search Report mailed Jan. 4, 2023", 6 pgs.

"Managing Privileged Access in Cloud Infrastructure", Gartner Inc., [Online]. Retrieved from the Internet: <URL: https://www.gartner.com/en/documents/3986121>, (Jun. 9, 2020), 5 pgs.

"The 5 Steps to Cloud Confidence", Netskope, [Online]. Retrieved from the Internet: <URL: http: //www.dgcompany.nl/downloads/The 5 Steps to Cloud Confidence/pdf>, (Jan. 1, 2014), 11 pgs.

* cited by examiner

CLOUD ENVIRONMENT SECURITY TOOL

BACKGROUND

Traditionally, software has been self-contained and executed at one or more local machines comprising an on-premise computing system. An enterprise desiring to use a software tool builds an on-premise computing system and executes a software application to provide the tool on that computing system. Cloud computing has disrupted this paradigm. Cloud computing allows enterprises to supplement or replace on-premise computing systems with cloud software, platforms, and even computing infrastructure provided as a service.

BRIEF DESCRIPTION OF DRAWINGS

The present disclosure is illustrated by way of example and not limitation in the following figures.

DETAILED DESCRIPTION

Figure 1:
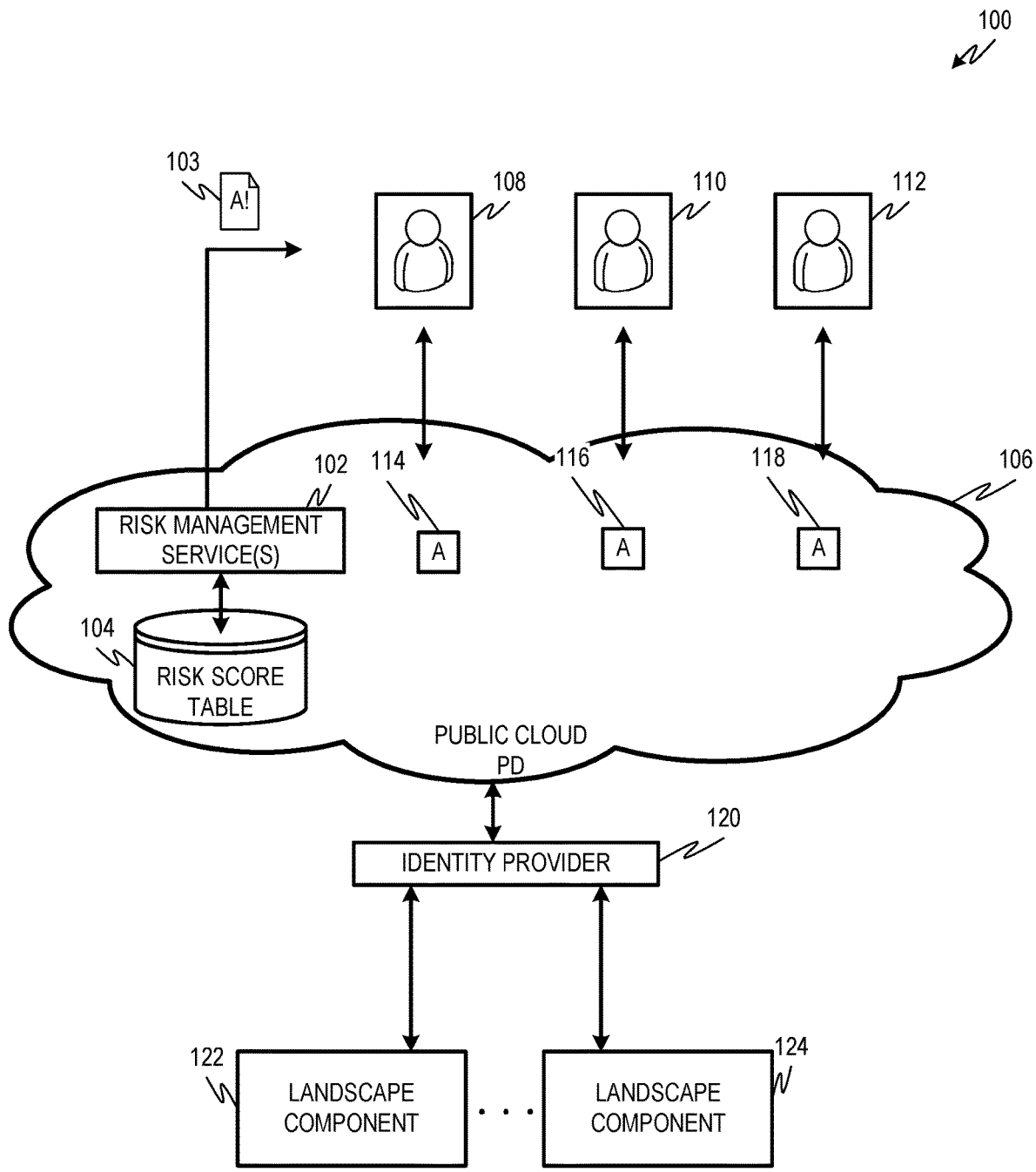
FIG. 1 is a diagram showing one example of an arrangement for executing risk management services in a public cloud platform deployment.

A client enterprise can use a cloud hyperscaler to implement computing infrastructure. A cloud hyperscaler is a service that maintains one or more data centers comprising various computing hardware. Examples of currently available cloud hyperscaler services include AWS™ from Amazon.com, Inc., Google Cloud™ from Google LLC., Azure™ from Microsoft, Inc., and Alibaba Cloud™ from Alibaba Group Holding Limited, among others.

Client enterprises can use hardware resources at the cloud hyperscaler data centers to execute applications and/or implement data storage that might otherwise have been performed using an on-premise computing system. In this way, the client enterprises utilize the hardware infrastructure resources of the cloud hyperscaler in place of an on-premise or other enterprise-implemented computing system.

A client enterprise uses the hyperscaler hardware to implement one or more cloud platform deployments. A cloud platform deployment includes one or more compute elements, one or more storage elements, and/or one or more network elements that are implemented virtually at the cloud hyperscaler hardware. Users associated with a client enterprise may access the cloud platform deployment of a client enterprise via the cloud hyperscaler.

A cloud platform deployment may be used to implement a private cloud environment or a public cloud environment. In a private cloud environment, the client enterprise implementing the cloud platform deployment may execute applications, implement storage, and the like at the cloud deployment. Users of the client entity may access the applications, storage, etc., at the private cloud environment.

In a public cloud environment, a cloud platform deployment is arranged into a number of tenancies held by tenant enterprises, referred to herein as tenants. For example, the client enterprise of a public cloud platform deployment may provide one or more application instances and/or data storage elements for use by the various tenants. Users associated with a tenant may access the cloud platform deployment to access one or more application instances executing at the cloud platform deployment for the tenant and/or one or more data stores maintained at the cloud platform deployment for the tenant.

Various examples utilize a hybrid cloud environment. In a hybrid cloud environment, a tenant at a public cloud platform deployment uses an application instance at the public cloud platform deployment in conjunction with landscape components implemented at other systems. For example, a tenant may configure an application instance to communicate with another application and/or data storage component implemented at an on-premise computing system, at a private cloud platform deployment, and/or at another public cloud platform deployment.

Cloud hyperscalers may use a shared responsibility model for implementing cloud platform deployments, where the cloud hyperscaler is responsible for configuring and maintaining the physical hardware at its data centers, while the client enterprise is responsible for configuring and managing the virtual compute elements, storage elements, and/or network elements making up the cloud environments. Tenants of the client may be responsible for selecting tenant users and determining access for those tenant users. Accordingly, the client enterprise and/or the tenants may be responsible for various security and other parameters of the compute elements, storage elements, and/or network elements making up a cloud environment.

In a hybrid cloud environment, the number and complexity of landscape components and user accesses may cause security challenges. For example, tenants may be responsible for selecting tenant users that access an application instance and for selecting levels of access for the tenant users. The tenant may select and provision users who directly access the application instance as well as the access provided to users who access the application instance indirectly via communication with other landscape components.

Managing users and access levels for those users can create security vulnerabilities in a cloud platform deployment. For example, a user may be provided with a level of access that is beyond that user's requirements. Also, in some examples, a user may leave an enterprise (e.g., for a new job or a new position) but the user's access to the application instance may remain. In these examples in which a user has more access than is necessary, the user him or herself and/or a nefarious party hijacking the user's account may use the access to perform malicious actions at the cloud platform deployment such as, for example, accessing private data, modifying application instances, and the like. The difficulties of user access tracking may be more pronounced in a hybrid cloud arrangement where some or all of the users accessing an application instance do so indirectly via another landscape component.

Identifying mismatches between users and corresponding access levels can be challenging. For example, a user having more access than needed may not seem to be a problem and may not be detectable as a problem until a security breach has occurred and it is too late.

Various examples described herein address these and other problems at least in part using a service-based solution to generate a total risk score for an application instance. Elements of the total risk score may be generated by various services that may be components of the application instance and/or may otherwise execute at the cloud platform deployment executing the application instance. For example, a landscape service may generate a landscape score for the application instance based on a plurality of landscape components that are to communicate with the application instance. An access frequency service may generate an access frequency score based on the access frequency of various users of the application instance. A last access service may generate a last access score for the application instance based on last access times for the users of the application instance. In some examples, a tenant incident service analyzes records of tenant incidents reported by users of the tenant associated with the application instance and generates a tenant incident score.

The landscape service, access frequency service, last access service, and/or tenant incident service writes their respective scores to a risk score record associated with the tenant. A risk management service may read the risk score record or records associated with the tenant and generate a total risk score for the application instance. If the total risk score is greater than a threshold, indicating a high risk of a security vulnerability, the risk management service may execute a corrective action. This may include, for example, sending an alert message to an administrative user account and/or executing one or more automated security tests.

FIG. 1 is a diagram showing one example of an arrangement 100 for executing risk management services 102 in a public cloud platform deployment 106. The arrangement 100 of FIG. 1 includes the public cloud platform deployment 106 and landscape components 122, 124. The public cloud platform deployment 106 executes application instances 114, 116, 118. The application instances 114, 116, 118 may be associated with respective user groups 108, 110, 112. Each user group 108, 110, 112 may be associated with respective tenants. For example, user group 108 may include users associated with a first tenant of the public cloud platform deployment 106 who utilize application instance 114. User group 110 may include users associated with a second tenant of the public cloud platform deployment 106 who use application instance 116. User group 112 may include users associated with a third tenant of the public cloud platform deployment 106 who use application instance 118.

User groups 108, 110, 112 indicate groups of one or more users who develop and/or use application instances 114, 116, 118 at the public cloud platform deployment 106. In some examples, each user group 108, 110, 112 is associated with a tenant. Also, in some examples, one or more of the user groups 108, 110, 112 are associated with the client entity for the public cloud platform deployment 106. For example, a user group 108, 110, 112 associated with the client entity for the public cloud platform deployment 106 may develop, test, and/or maintain application instances 114, 116, 118 for use by other user groups 108, 110, 112 associated with tenants.

In the example of FIG. 1, the application instances 114, 116, 118 are in communication with landscape components 122, 124. The landscape components 122, 124 may be any suitable data sources and/or applications that are in communication with one or more of the application instances 114, 116, 118. The landscape components 122, 124 may be resident at another public cloud platform deployment, at a private cloud environment, and/or at an on-premise computing system. For example, the tenant associated with one or more of the user groups 108, 110, 112 may utilize a separate private cloud environment and/or on-premise computing system including applications and/or data sources that are to communicate with the application instance 114, 116, 118 associated with that tenant.

The landscape components 122, 124 may be utilized by the application instances 114, 116, 118 in various suitable ways. Consider an example application instance 114, 116, 118 implementing analytics management for a business enterprise, such as the SAP® Analytics Cloud application available from SAP SE of Waldorf, Germany. Such an application may be in communication with one or more backend systems, which may be implemented as one or more landscape components 122, 124 outside of the public cloud platform deployment 106 such as, for example, at another public cloud platform deployment, a private cloud platform deployment, and/or an on-premise computing system. The analytics management application, upon receiving a query, may access one or more of the landscape components 122, 124 to fetch data for analysis and response to the query.

In some examples, the application instances 114, 116, 118 access the landscape components via an identity provider service 120. The identity provider service 120 may be configured to verify the identity of the application instance 114, 116, 118 to the landscape components 122, 124 and/or to verify the identify of the various landscape components 122, 124 to the application instances 114, 116, 118.

In the example of FIG. 1, the public cloud platform deployment 106 also includes a risk management service 102 and a risk score table 104. The risk management service 102 may perform and/or manage operations to generate risk scores describing one or more of the application instances 114, 116, 118 such as, for example, a landscape score, an access frequency score, a last access score, and/or a tenant incident score. The risk scores for an application instance 114, 116, 118 may be written to one or more risk score records at the risk score table 104. Risk score records at the risk score table 104 may be associated with a tenant and an application instance 114, 116, 118. In some examples, the risk score record for a tenant may include one row of the risk score table 104 and/or multiple rows of the risk score table 104.

The risk management service 102 may generate a total risk score for a tenant and/or for an application instance 114, 116, 118. If the total risk score is greater than a threshold value, the risk management service 102 may send an alert message 103 to an administrative user account associated with the tenant. The administrative user account may be for a tenant administrative user who is part of one of the user groups 108, 110, 112. For example, a tenant may designate one or more users as administrative users. The risk management service 102 may direct the alert message 103 to one or more of the tenant administrative users. In some examples, the alert message 103 is sent to an administrative user who is part of an administrative user group associated with the client enterprise providing the application instances 114, 116, 118 at the public cloud platform deployment 106 (e.g., user group 205 of FIG. 2).

The administrative user, upon receiving the alert message 103, may investigate security risk for the application instance 114, 116, 118 and/or tenant that is the subject of the alert message 103 and take a responsive action such as, for example, modifying the access rights of one or more users of the relevant user group 108, 110, 112, conducting additional tests, and the like.

Figure 2:
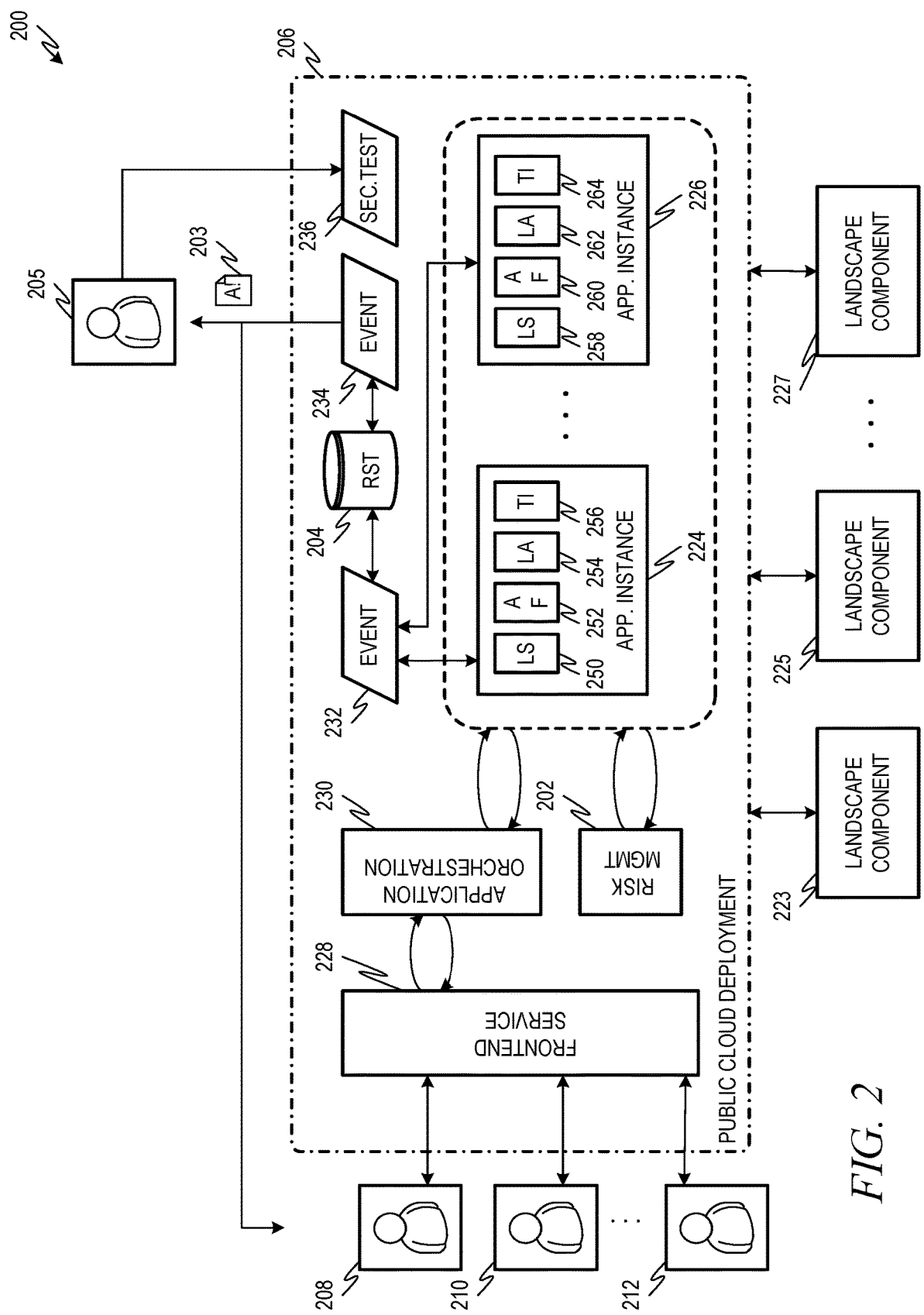
FIG. 2 is a diagram showing another example of an arrangement for executing risk management in a public cloud platform deployment.

FIG. 2 is a diagram showing another example of an arrangement 200 for executing risk management in a public cloud platform deployment 206. In this example, user groups 208, 210, 212 develop, maintain, and/or utilize one or more application instances 224, 226. For example, user group 208 may be associated with a first tenant of the public cloud platform deployment 206 and may utilize application instance 224. User group 210 may be associated with a second tenant of the public cloud platform deployment 206 and may utilize application instance 226. The application instances 224, 226 are in communication with landscape components 223, 225, 227, which may include applications or data stores at another public cloud platform deployment, at a private cloud environment, and/or at an on-premises computing system. Although two application instances 224, 226 are shown in FIG. 2, the public cloud platform deployment 206 may include more or fewer application instances for more or fewer tenant user groups.

FIG. 2 also shows an administrative user group 205. The administrative user group 205 may include users associated with the client entity that implements the public cloud platform deployment 206. For example, users of the user group 205 may develop and/or maintain the application instances 224, 226 and/or the public cloud platform deployment 206 itself. For example, the administrative user group 205 may include users who administer the public cloud platform deployment 206 for all tenant user groups 208, 210, 212.

The application instances 224, 226 are, in some examples, implemented according to a microservice architecture. According to a microservice architecture, each application instance 224, 226 is implemented by a collection of loosely-coupled microservices executing at the cloud environment. Each microservice may also include a single executable that executes in a separate virtual machine (VM) or container implemented by the cloud environment. Individual microservices may be programmed to perform a defined task or small set of tasks and interact with the other microservices in a defined way, for example, according to an application programming interface (API).

In the example of FIG. 2, the public cloud platform deployment 206 also executes one or more services 228, 230, 202 for managing the application instance 224, 226. The services 228, 230, 202 may execute at the public cloud platform deployment 206 in one or more containers. A frontend service 228 may interface with the various user groups 208, 210, 212. For example, the frontend service 228 may provide users from various user groups 208, 210, 212 with a user interface to allow the users to manage application instances 224, 226 that are executing and/or to launch new application instances. For example, the frontend service 228 may provide the various user groups 208, 210, 212 with functionality to create, upgrade, delete, and/or otherwise manage application instances 224, 226.

Application orchestration services 230 may manage the execution of the application instances 224, 226. In some examples, the application orchestration service 230 implement a container orchestration system, such as a Kubernetes® container orchestration system. In some examples, the application orchestration service 230 manages the execution of the one or more containers implementing an application instance 224, 226. For example, the application orchestration service 230 may begin the execution of one or more containers for implementing an application instance 224, 226, for example, from one or more container images associated with the one or more containers. Also, if one or more containers associated with an application instance 224, 226 crash, the application orchestration service 230 may spin up a replacement for the crashed container or containers.

In the example of FIG. 2, the application instances 224, 226 include various risk services 250, 252, 254, 256, 258, 260, 262, 264. The risk services 250, 252, 254, 256, 258, 260, 262, 264 perform various risk operations such as, for example, determining various risk related scores for the application instances 224, 226 and associated tenants. In examples where the application instances 224, 226 are arranged according to a microservice architecture, the risk services 250, 252, 254, 256, 258, 260, 262, 264 may be implemented as microservices that are part of the microservice architecture making up the application instances 224, 226.

In some examples, the risk microservices include a landscape component service 250, 258. The landscape component service 250, 258 generates a landscape score for the respective application instance 224, 226. The landscape component service 250, 258 many identify landscape components 223, 225, 227 that are in communication with the respective application instance 224, 226 and generate a landscape score for the application instance 224, 226.

For example, the landscape component service 250, 258 may identify landscape components 223, 225, 227 that are to communicate with the respective application instance 224, 226. This can be performed in any suitable manner. In some examples, the application instances 224, 226 may be configured with different kinds of connections for connecting to different types of landscape components. Accordingly, the landscape component service 250, 258 may query one or more other services implementing the respective application instance 224, 226 to identify connections to landscape components 223, 225, 227.

In some examples, the landscape component service 250, 258 also determines risk data about various landscape components 223, 225, 227 to which the respective application instance 224, 226 is to connect. For example, the landscape component service 250 may determine whether a landscape component 223, 225, 227 utilizes a firewall and, if so, what kind of firewall. In some examples, the landscape component service 250, 258 determines whether a landscape component 223, 225, 227 permits access by users with mobile computing devices and/or whether the landscape component 223, 225, 227 permits proxy connections. In another example, the risk data about a landscape component 223, 225, 227 may indicate whether the landscape component 223, 225, 227 uses an identity provider to control access (e.g., such as the identity provider service 120 of FIG. 1) and, if so, which identity provider is used and/or other properties of the identity provider.

In some examples, the landscape component service 250, 258 accesses and/or generates a risk score for some or all of the landscape components 223, 225, 227 that are to communicate with the respective application instance 224, 226. The risk score for an individual landscape component 223, 225, 227 may be based on the risk data about the landscape component.

The landscape component service 250, 258 may determine a landscape score for the respective application instance 224, 226. The landscape score reflects a level of security risk to the respective application instance due to its connected landscape components. The landscape score may be determined in any suitable way. In some examples, the landscape score for a respective application instance 250, 258 is a sum, weighted sum, or other aggregation of risk scores for individual landscape components that are to communicate with the application instance 224, 226. For example, the landscape score may be or include a sum, an average, a weighted sum, a weighted average, or other aggregation of the individual risk scores for the landscape components 223, 225, 227 that communicate with and/or are configured to communicate with the respective application instance 224, 226. The landscape component service 250, 258 may write the landscape score for the respective application instance to a risk score record at the risk score table 204 that is associated with the relevant tenant.

In some examples, the risk microservices include an access frequency service 252, 260. The access frequency service 252, 260 determines the frequency with which users from the relevant tenant user group 208, 210, 212 access the application instance. In some examples, the respective application instance 224, 226 keeps an access log indicating users who access the application instance 224, 226 and, optionally, the functions performed by and/or documents accessed by the users. The access frequency service 252, 260 may read user accesses from the access log and generate an access frequency for one or more of the users from the relevant tenant user group 208, 210, 212. In some examples, the access frequency service 252, 260 generates an access frequency for a user indicating the frequency with which the user accesses the application instance 224, 226.

In some examples, the access frequency service 252, 260 generates access frequencies by user and by application instance functionality. For example, if a first user from the user group 208 has read access and write access to the application instance 224, the access frequency service 252 may generate a read access frequency for the first user indicating how often the user utilizes read access to the application instance 224 and a write access frequency indicating how often the user utilizes write access to the application instance 224. Consider another example in which the application instance 226 permits a user to run two different kinds of reports. The access frequency service 260 may generate a first report frequency indicating the frequency with which the first user generates the first kind of report and a second report frequency indicating the frequency with which the user generates the second kind of report.

The access frequency service 252, 260 may generate access frequency scores for the respective application instances 224, 226. The access frequency scores may indicate a degree of mismatch between the access rights of users from the relevant user group 208, 210, 212 and the actual user access to the respective application instance 224, 226.

In some examples, the access frequency score for an application instance 224, 226 is based on the type of user. For example, different users may have different access patterns. Consider an example in which the application instances 224, 226 implement an enterprise resource management solution. Users who work in the enterprise accounting or billing department may access the application instance 224, 226 frequently to perform regular (e.g., daily or weekly) tasks. On the other hand, users who work as salespeople may only access the application instance 224, 226 at the end of a quarter or similar time period to upload activity during the time period. The access frequency service 252, 260 may distinguish between different types of users in generating an access frequency score. For example, a user from the accounting or billing department who accesses the application instance 224, 226 once a quarter may contribute to a high risk access frequency score while a salesperson user who accesses the application instance 224, 226 once per quarter may not.

Consider another example in which an application instance 224, 226 is an analytics application having users with four different roles: a content viewer (CV) role, a content creator (CC) role, an administrator (Admin) role, and a system owner (SYS Owner) Role. TABLE 1 below is an example showing a raw number of accesses by users having the different roles:

TABLE 1

| Average Frequency of Access per 30 Days | | | |
|---|---|---|---|
| CV | CC | Admin | SYS Owner |
| 120 | 60 | 2 | 1 |

In this example, the access frequency score for the application instance 224, 226 may be based on an aggregation of the average frequency of access per period across the different roles. For example, the access frequency score for the application instance 224, 226 may be an average, weighted average, sum, and/or the like.

In some examples, the risk microservices include a last access service 254, 262. The last access service 254, 262 may determine the last time or most recent time that users from the relevant tenant user group 208, 210, 212 have accessed the respective application instance 224, 226. In some examples, last access service 254, 262 accesses an access log indicating users who access the application instance 224, 226 and, optionally, the functions performed by and/or documents accessed by the users. The last access service may generate a last access score for the respective application instance 224 and write the last access score to the risk score record at the risk score table 204 that is for the relevant tenant.

Also, in some examples, the risk microservices include a tenant incident service 256, 264. The tenant incident service 256, 264 reviews records of tenant incidents reported by the various user groups 208, 210, 212. For example, user groups 208, 210, 212 may report incidents associated with the application instances 224, 226 and/or other aspects of the public cloud platform deployment 206. In some examples, tenant incidents may be reported by any user from a user group 208, 210, 212. In other arrangements, tenant incidents are reported by administrative users from the respective user groups.

In various examples, tenant incidents may be reported to and/or stored by the risk management service 202, the frontend service 228, or other suitable component at the public cloud platform deployment 206. Customers from the user groups 208, 210, 212 may report a tenant incident when they experience something noteworthy while using an application instance 224, 226 and/or another aspect of the public cloud platform deployment 206. For example, if a user observes a user access right or other setting that the user believes might pose a security threat, the user may report a tenant incident. In a similar example, if an application instance 224, 226 executes and produces a result that the user believes might cause a security risk, the user may report a tenant incident. Some tenant incidents describe immediate security threats and may be escalated immediately for responsive actions. In other cases, however, a tenant incident may not be escalated right away, but may still indicate an unrecognized security risk.

The tenant incident service 256, 264 may review reported tenant incidents for the respective application instance 224, 226 and identify patterns that indicate a security risk. This may include reviewing tenant incident reports that were escalated at or near the time of reporting as well as tenant incident reports that were not escalated. In this way, the tenant incident service may reflect security risks that may not be captured by an incident escalation process.

In the example of FIG. 2, execution of the risk services 250, 252, 254, 256, 258, 260, 262, 264 may be triggered by an event 232. The event 232 may be, for example, a request from an administrative user (e.g., a tenant administrative user from one of the user groups 208, 210, 212 and/or from an administrative user from the user group 205). In some examples, the event 232 occurs periodically (e.g., once per day, once per week, once per hour, etc.). Also, the event may trigger execution of the risk services 250, 252, 254, 256, 258, 260, 262, 264 for all application instances 224, 226 and/or for a subset of application instances 224, 226.

As described herein, the risk services 250, 252, 254, 256, 258, 260, 262, 264 may write respective risk scores to a risk score record associated with the relevant tenant at the risk score table 204. TABLE 2 below shows an example representation of the risk score table:

TABLE 2

| Tenant Name | Access Frequency | Last Access | Landscape | Customer Incident |
|---|---|---|---|---|
| Xyz.app1.cloud | — | — | — | — |
| Abc.app2.com | — | — | — | — |
| — | — | — | — | — |

In TABLE 2, each risk score record includes a Tenant Name field indicating a name of the tenant and a corresponding application instance. An Access Frequency field may store an access frequency score generated, for example, by the access frequency service 252, 260 for the corresponding tenant or application instance 224, 226. A Last Access field may store a last access score for the corresponding tenant or application instance 224, 226. A Landscape field may store a landscape score for the corresponding tenant or application instance 224, 226. A Customer Incident field may store a tenant incident score for the corresponding tenant or application instance 224, 226. Although the example of TABLE 2 shows tenant risk score records that make up a single row of the table, it will be appreciated that other arrangements of tenant risk score records may include more than one row of a risk score table 204 and/or other arrangements.

In some examples, upon execution of the risk services 250, 252, 254, 256, 258, 260, 262, 264, the risk management service 202 may execute to determine a total risk score for an application instance 224, 226. The risk management service 202 may read the tenant risk score record for the tenant corresponding to an application instance 224, 226 to retrieve scores generated by the various risk services 250, 252, 254, 256, 258, 260, 262, 264. The risk management service 202 may utilize these scores to generate the total risk score for the application instance 224, 226. If the total risk score is greater than a threshold value, the risk management service 202 may trigger event 234. Upon triggering of event 234, the risk management service 202 sends an alert message 203 to an administrative user account, such as a tenant administrative user account from the appropriate user group 208, 210, 212 and/or an administrative user account from the administrative user group 205. In some examples, event 234 may also trigger additional security tests 236. The additional security tests 236, in some examples, can also be manually triggered by an administrative user, such as the administrative user who received the alert message 203.

Examples of additional security tests 236 include, for example, one or more dynamic analysis and security tests (DAST) based on an area of a maximum risk score. A DAST may detect vulnerabilities in the application instance 224, 226 such as, for example, cross-site scripting, injection errors like Structured Query Language (SQL) injection or command injection, path traversal, insecure server configuration, and the like. Consider an example in which a content creator assigned to a first user group is able to access a folder of a second user group, where the content create from the first user group should not be permitted to access the folder of the second user group. A DAST may include a pre-automated combination of tests to detect such vulnerabilities.

Figure 3:
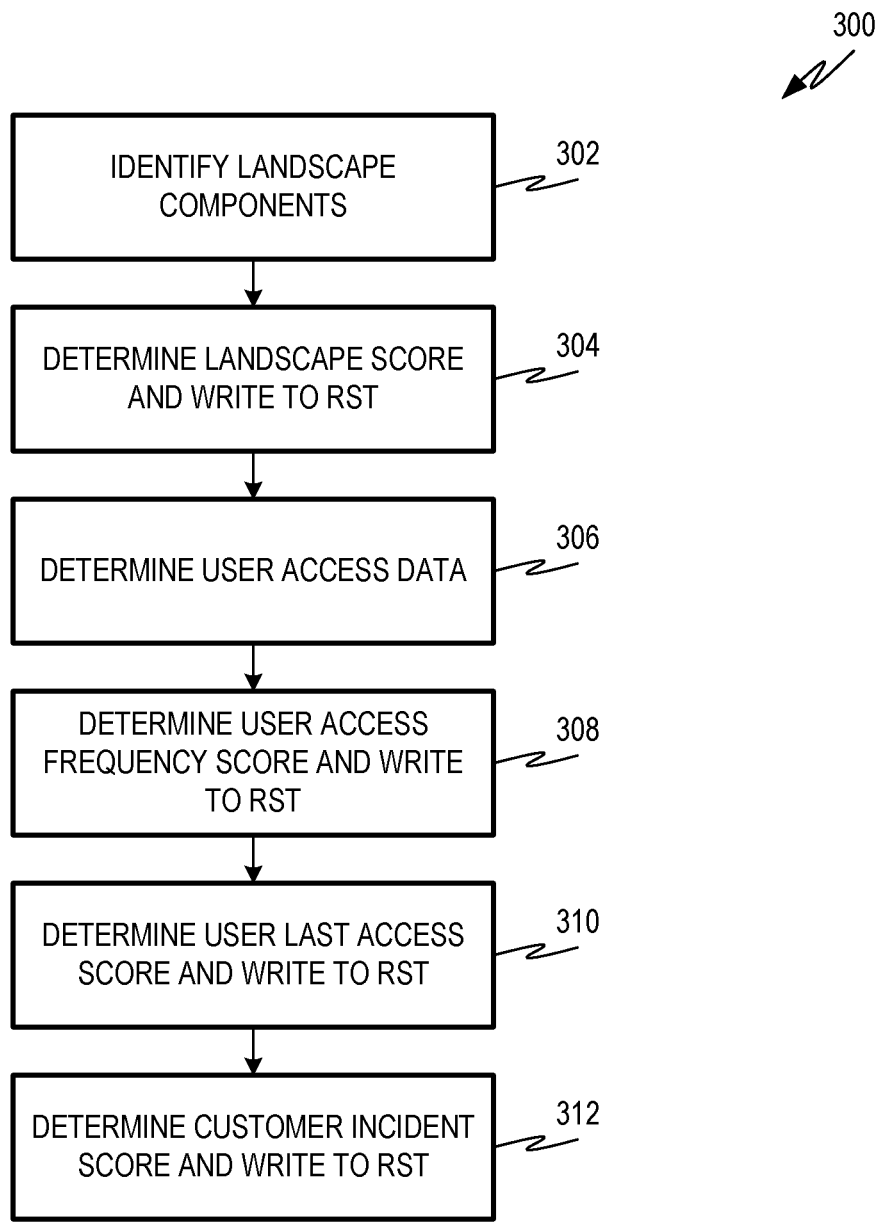
FIG. 3 is flowchart showing one example of a process flow for managing the security of an application instance executing for a tenant at a public cloud platform deployment.

FIG. 3 is flowchart showing one example of a process flow 300 for managing the security of an application instance executing for a tenant at a public cloud platform deployment. The process flow 300 is described as being executed by components of the arrangement 200 of FIG. 2. In various examples, however, the process flow 300 may be executed in other arrangements such as, for example, the arrangement 100 of FIG. 1. The process flow 300 may be triggered by any suitable trigger event. In some examples, the process flow 300 is triggered by event 232, which may occur periodically and/or be manually begun by a user, such as an administrative user from the administrative user group 205 and/or one of the tenant user groups 208, 210, 212. Also, the process flow 300 is described with respect to a single application instance 224 that is associated with a tenant of that instance. It will be appreciated that equivalent risk services may perform equivalent operations in other application instances associated with other tenants, such as the application instance 226, concurrently or not concurrently.

At operation 302, the landscape service 250 identifies landscape components 223, 225, 227 of the application instance 224. Landscape components 223, 225, 227 of the application instance 224 may include those landscape components 223, 225, 227 that are in communication with the application instance 224. At operation 304, the landscape service 250 determines a landscape score for the application instance 224 and writes the landscape score to the risk score record associated with the tenant of the application instance 224.

At operation 306, the access frequency service 252 retrieves use access data for the application instance 224. The user access data describes user accesses of the application instance 224. The user access data, in some examples, is generated from one or more access logs maintained by the application instance 224. For example, the user access data may indicate, for a set of users, a number of accesses to the application instance 224. In some examples, the user access data also describes, for each user, a type of access (e.g., read access, write access, a document or report that was accessed, and the like). At operation 308, the access frequency service 252 determines a user access frequency score for the application instance 224 and writes the user access frequency score to the risk score record associated with the tenant of the application instance 224.

At operation 310, the last access service 254 determines a user last access score for the application instance 224. In some examples, the user last access score is determined using the user access data retrieved by the access frequency service 252. Also, in some examples, the last access service 254 retrieves user access data, for example, from one or more access logs maintained by the application instance 224. The last access service 254 writes the last access score to the risk score record associated with the tenant of the application instance 224.

At operation 312, the tenant incident service 256 determines a tenant incident score for the application instance 224. Determining the tenant incident score may include retrieving reports of tenant incidents and determining a level of risk represented by the tenant incidents. The tenant incident score may be written to the risk score record associated with the tenant of the application instance 224.

Figure 4:
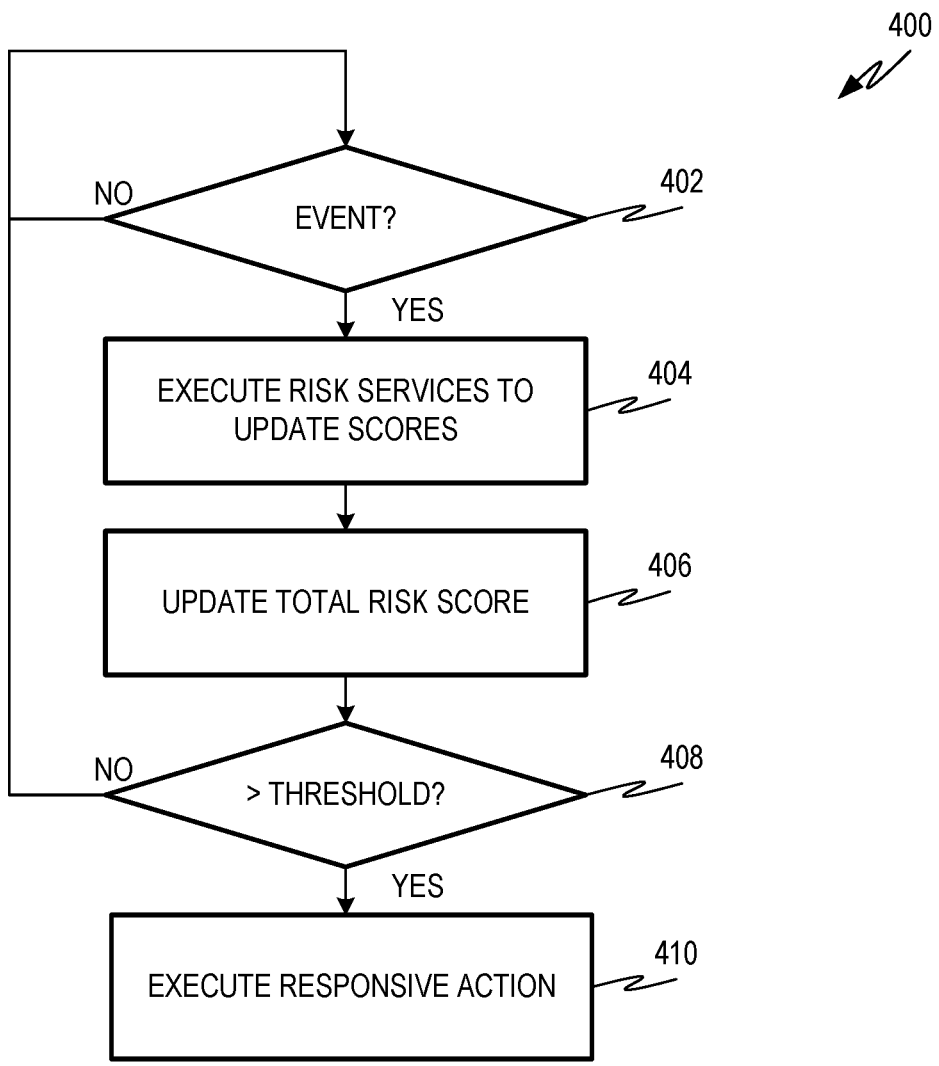
FIG. 4 is a flowchart showing one example of a process flow that may be executed by a risk management service to respond to a risk condition at an application instance.

FIG. 4 is a flowchart showing one example of a process flow 400 that may be executed by the risk management service 202 to respond to a risk condition at an application instance 224. Although the process flow 400 is described with respect to the application instance 224, it will be appreciated that the process flow 400 may be executed with respect to the application instance 226 or another application instance.

At operation 402, the risk management service 202 determines whether a triggering event 232 has occurred. As described herein, the triggering event may be any suitable event. In some examples, the process flow 400 is executed periodically (e.g., once per day, once per hour). A triggering event may occur at the scheduled time for executing the process flow 400. In some examples, the process flow 400 is executed upon prompting from an administrative user, such as from the administrative user group 205.

If no triggering event has occurred, the process flow 400 may return to operation 402 and await a triggering event. At operation 404, if a triggering event has occurred, the risk management service 202 executes the risk services 250, 252, 254, 256 to generate relevant scores to update the risk score record associated with the tenant of the application instance 224. Executing the operation 404 may comprise prompting and/or triggering execution of the process flow 300 described herein with respect to FIG. 3.

At operation 406, the risk management service 202 updates a total risk score for the application instance 224. The total risk score may be generated from one or more of the scores from the risk score record for the tenant. In some examples, the total risk score is generated from one or more of a landscape score for the application instance 224, an access frequency score for the application instance, a last access score for the application instance 224, and/or a tenant incident score for the application instance 224.

The total risk score may be generated in various suitable ways. In some examples, the total risk score is an aggregation of two or more of the landscape score, the access frequency score, the last access score, and/or the tenant incident score for the application instance. The aggregation may be, for example, a sum, weighted sum, or other aggregation of the various scores. In some examples, the risk score is generated using a trained machine learning model. For example, the machine learning model may be trained with training data indicating combinations of landscape scores, access frequency scores, last access scores, and/or tenant incident scores that are correlated to security risks and/or security incidents. Upon training, the machine learning model may receive the various application instance scores from a risk score record and generate the total risk score as an output.

At operation 408, the risk management service 202 determines whether the total risk score is greater than a threshold, indicating that the security risk to the application instance 224 is greater than the threshold. If the total risk score is not above the threshold, the risk management service 202 may return to operation 402 and begin looking for a next trigger event.

If the security risk to the application instance 224 is greater than the threshold at operation 408, the risk management service 202, at operation 410, may execute a responsive action. Various responsive actions may be executed. In some examples, the responsive action comprises modifying access rights of one or more users of the application instance 224. In some examples, the responsive action comprises sending an alert, such as the alert message 203, to an administrative user. In some examples, the responsive action includes executing additional security tests, such as the additional security tests 236.

Figure 5:
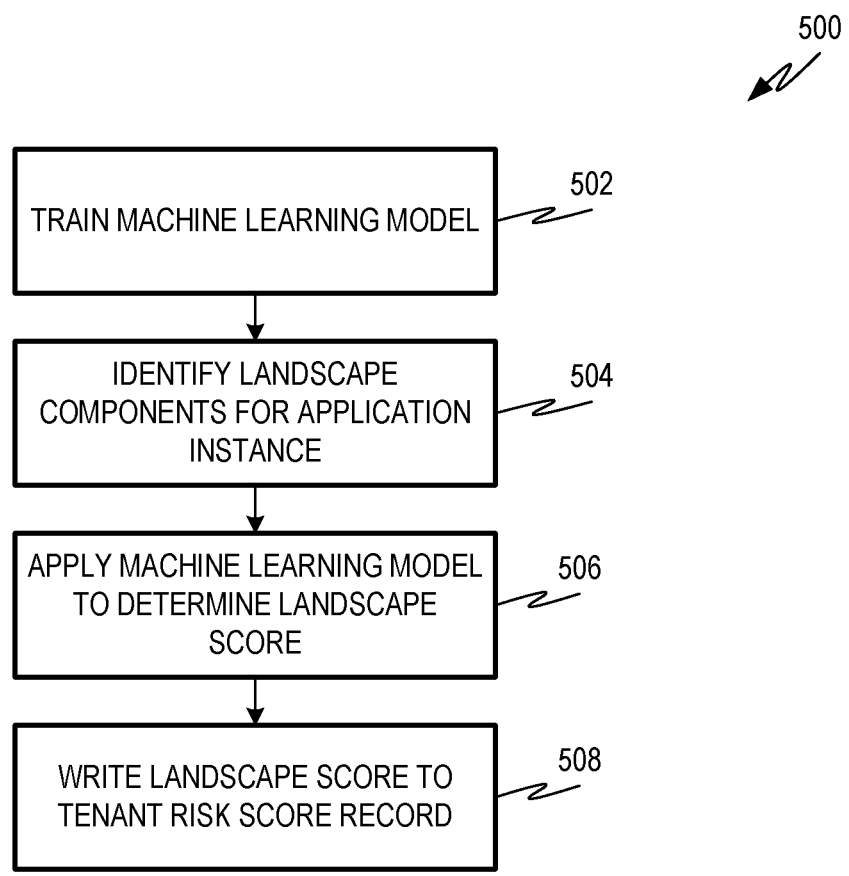
FIG. 5 is a flowchart showing one example of a process flow that may be executed by a landscape service to generate a landscape score for an application instance.

FIG. 5 is a flowchart showing one example of a process flow 500 that may be executed by the landscape service 250 to generate a landscape score for an application instance 224. The process flow 500 is described with respect to the landscape service 250 and the application instance 224. It will be appreciated, however, that the process flow 500 may be executed by other services, such as landscape service 258, with respect to other application instances, such as application instance 226.

At operation 502, a landscape machine learning model is trained. In some examples, the landscape machine learning model is trained by the landscape service 250. In other examples, the operation 502 is performed by a different software component and the resulting trained model provided to the landscape service 250. The landscape machine learning model may be trained with training data that describes different configurations and communication connections between application instances and landscape components 223, 225, 226 and associated security risks. The landscape machine learning model may be trained with the training data to generate a landscape score that is indicative of the level of security risk associated with a configuration of connections to landscape components 223, 225, 227. Any suitable form may be used for the landscape machine learning model. For example, the landscape machine learning model may be or include a neural network model, a Logistic Regression model, a Naïve Bayes model, a Stochastic Gradient Descent model, a K-Nearest Neighbors model, Decision Tree model, a Random Forest model, a Support Vector Machine model, or any other suitable type of machine learning model.

At operation 504, the landscape service 250 identifies landscape components that are to communicate with the application instance 224. At operation 506, the landscape service 250 applies the trained landscape machine learning model to determine the landscape score for the application instance 224 and, at operation 508, writes the landscape score to the risk score record associated with the tenant for the application instance 225.

Figure 6:
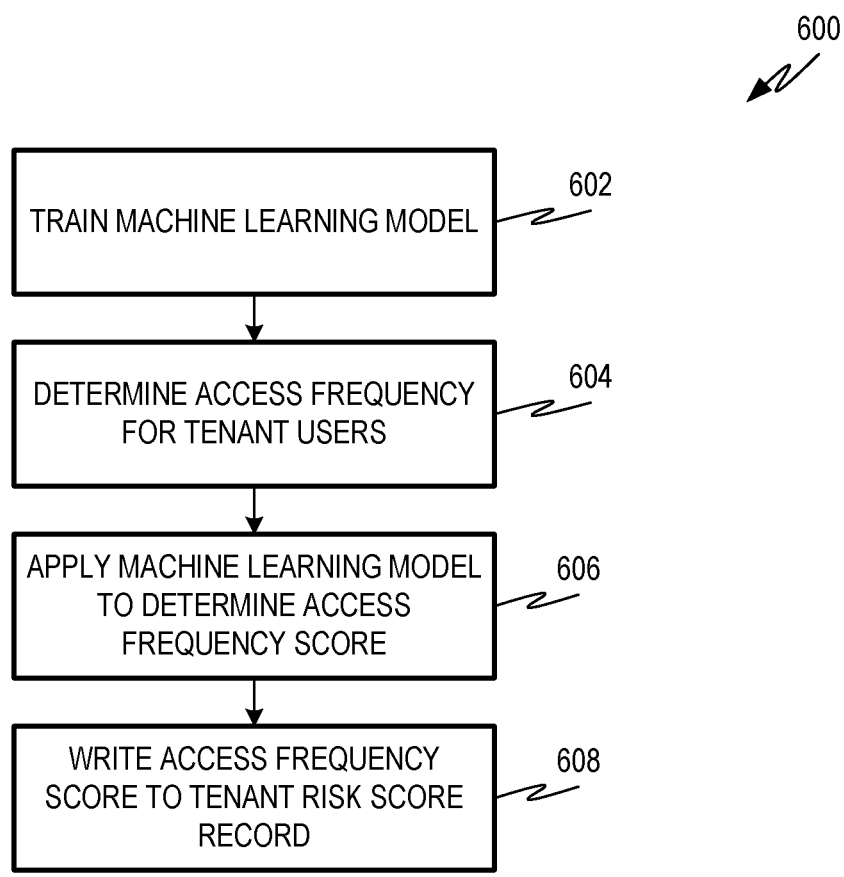
FIG. 6 is a flowchart showing one example of a process flow that may be executed by an access frequency service to generate an access frequency score for an application instance.

FIG. 6 is a flowchart showing one example of a process flow 600 that may be executed by the access frequency service 252 to generate an access frequency score for an application instance 224. The process flow 600 is described with respect to the access frequency service 252 and the application instance 224. It will be appreciated that the process flow 600 may be executed by other services, such as access frequency service 260, with respect to other application instances, such as application instance 226.

At operation 602, an access frequency machine learning model is trained. In some examples, the access frequency machine learning model is trained by the access frequency service 252. In other examples, the operation 602 is performed by a different software component and the resulting trained model provided to the access frequency service 252. The access frequency machine learning model may be trained with training data that describes different combinations of user access frequencies and associated security risks. The access frequency machine learning model may be trained with the training data to generate an access frequency score that is indicative of the level of security risk associated with different combinations of access frequency by user type and/or by type of access to the application instance 224. Any suitable form may be used for the access frequency machine learning model. For example, the access frequency machine learning model may be or include a neural network model, a Logistic Regression model, a Naïve Bayes model, a Stochastic Gradient Descent model, a K-Nearest Neighbors model, Decision Tree model, a Random Forest model, a Support Vector Machine model or any other suitable type of machine learning model.

At operation 604, the access frequency service 252 determines access frequency data indicating the access frequencies of one or more users, such as the users of a user group 208, 210, 212 associated with the tenant of the application instance 224. At operation 606, the access frequency service 252 applies the trained access frequency machine learning model to determine the access frequency score for the application instance 224 and, at operation 608, writes the access frequency score to the risk score record associated with the tenant for the application instance 224.

Figure 7:
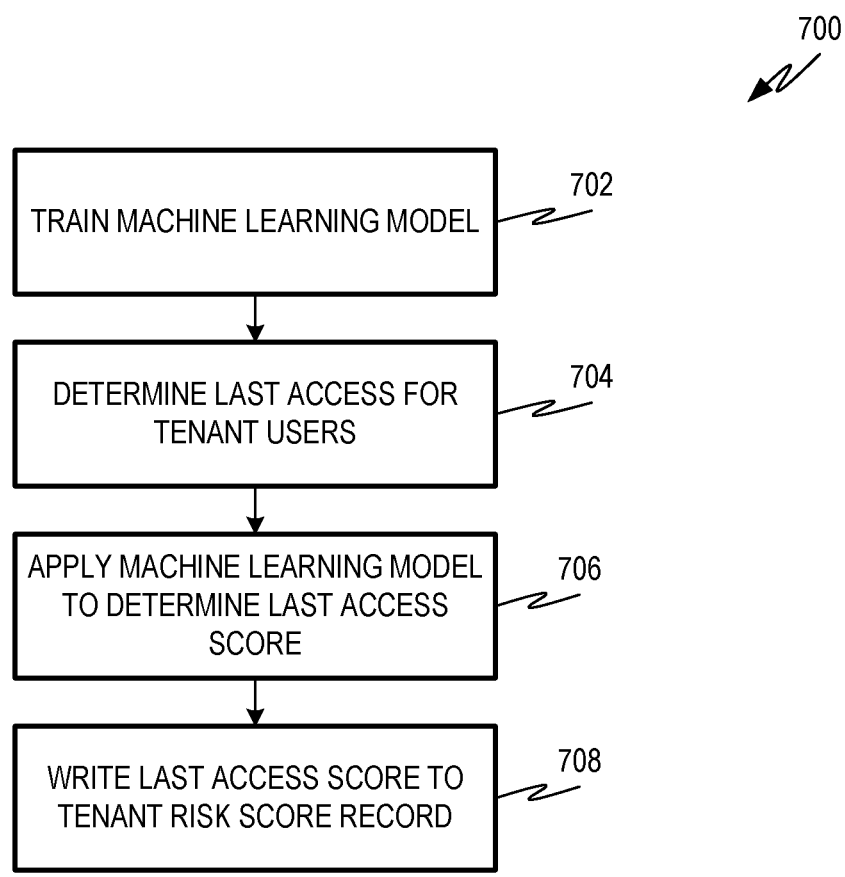
FIG. 7 is a flowchart showing one example of a process flow that may be executed by a last access service to generate a last access score for an application instance.

FIG. 7 is a flowchart showing one example of a process flow 700 that may be executed by the last access service 254 to generate a last access score for an application instance 224. The process flow 700 is described with respect to the last access service 254 and the application instance 224. It will be appreciated that the process flow 700 may be executed by other services, such as last access service 262, with respect to other application instances, such as application instance 226.

At operation 702, a last access machine learning model is trained. In some examples, the last access machine learning model is trained by the last access service 254. In other examples, the operation 702 is performed by a different software component and the resulting trained model provided to the last access service 254. The last access machine learning model may be trained with training data that describes different combinations of user last access times and associated security risks. The last access machine learning model may be trained with the training data to generate a last access score that is indicative of the level of security risk associated with different combinations of last access by user type and/or by type of access to the application instance 224. Any suitable form may be used for the last access machine learning model. For example, the last access machine learning model may be or include a neural network model, a Logistic Regression model, a Naïve Bayes model, a Stochastic Gradient Descent model, a K-Nearest Neighbors model, Decision Tree model, a Random Forest model, a Support Vector Machine model or any other suitable type of machine learning model.

At operation 704, the last access service 254 determines last access data indicating the last access of the application instance 224 by one or more users, such as the users of a user group 208, 210, 212 associated with the tenant of the application instance 224. At operation 706, the last access service 254 applies the trained last access machine learning model to determine the last access score for the application instance 224 and, at operation 708, writes the last access score to the risk score record associated with the tenant for the application instance 224.

Figure 8:
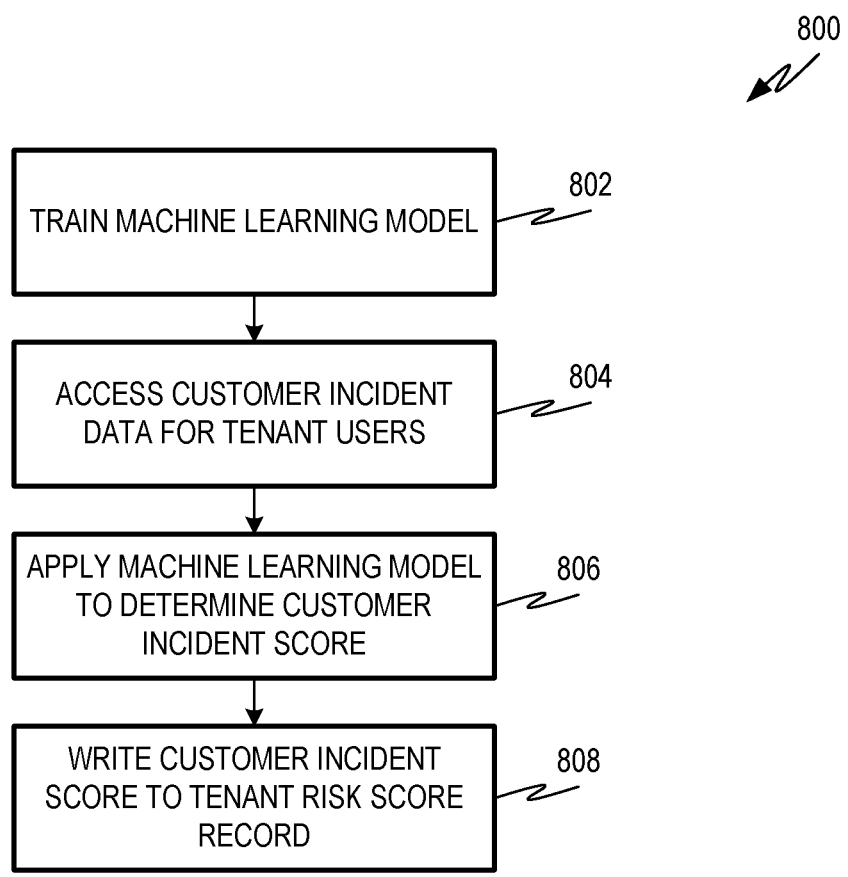
FIG. 8 is a flowchart showing one example of a process flow that may be executed by the tenant incident service to generate a tenant incident score for an application instance.

FIG. 8 is a flowchart showing one example of a process flow 800 that may be executed by the tenant incident service 256 to generate a tenant incident score for an application instance 224. The process flow 800 is described with respect to the tenant incident service 256 and the application instance 224. It will be appreciated that the process flow 800 may be executed by other services, such as the tenant incident service 254, with respect to other application instances, such as application instance 226.

At operation 802, a tenant incident machine learning model is trained. In some examples, the tenant incident machine learning model is trained by the tenant incident service 256. In other examples, the operation 802 is performed by a different software component and the resulting trained model provided to the tenant incident service 256. The tenant incident machine learning model may be trained with training data that describes tenant incidents and associated security risks. The tenant incident machine learning model may be trained with the training data to generate a tenant incident score that is indicative of the level of security risk associated with different combinations of tenant incidents reported for the application instance 224. Any suitable form may be used for the tenant incident machine learning model. For example, the tenant incident machine learning model may be or include a neural network model, a Logistic Regression model, a Naïve Bayes model, a Stochastic Gradient Descent model, a K-Nearest Neighbors model, Decision Tree model, a Random Forest model, a Support Vector Machine model or any other suitable type of machine learning model.

At operation 804, the tenant incident service 256 determines tenant incident data indicating the tenant incident of the application instance 224 by one or more users, such as the users of a user group 208, 210, 212 associated with the tenant of the application instance 224. At operation 806, the tenant incident service 256 applies the trained tenant incident machine learning model to determine the tenant incident score for the application instance 224 and, at operation 808, writes the tenant incident score to the risk score record associated with the tenant for the application instance 224.

In view of the disclosure above, various examples are set forth below. It should be noted that one or more features of an example, taken in isolation or combination, should be considered within the disclosure of this application.

EXAMPLES

Example 1 is a cloud security system, comprising: a public cloud platform deployment executing an application instance for a first tenant of the public cloud platform deployment, the application instance comprising a landscape service, an access frequency service, and a last access service, the public cloud platform deployment being programmed to perform operations comprising: determining, by the landscape service, a landscape score for the application instance, the landscape score describing a plurality of landscape components to communicate with the application instance; determining, by the access frequency service, an access frequency score for the application instance, the access frequency score based at least in part on access frequencies for a plurality of users of the first tenant; determining, by the last access service, a last access score for the application instance, the last access score based at least in part on last access times for the plurality of users; determining a total risk score for the application instance using the landscape score for the application instance, the access frequency score for the application instance, and the last access score for the application instance; and responsive to determining that the total risk score for the application instance is greater than a threshold value, sending an alert message to an administrative user account for the public cloud platform deployment.

In Example 2, the subject matter of Example 1 optionally includes the operations further comprising, writing, by the landscape service, the landscape score to a risk score record associated with the first tenant; writing, by the access frequency service, the access frequency score for the application instance to the risk score record associated with the first tenant; and writing, by the last access service, the last access score for the application instance to the risk score record associated with the first tenant.

In Example 3, the subject matter of any one or more of Examples 1-2 optionally includes the operations further comprising, responsive to determining that the total risk score for the application instance is greater than a threshold value, executing a security test of the application instance.

In Example 4, the subject matter of any one or more of Examples 1-3 optionally includes the operations further comprising determining, by the last access service, the last access times for the plurality of users of the first tenant, a last access time for a first user of the plurality of users indicating a most recent time that the first user has accessed the application instance.

In Example 5, the subject matter of any one or more of Examples 1-4 optionally includes the operations further comprising identifying, by the landscape service, the plurality of landscape components to communicate with the application instance, the plurality of landscape components comprising at least one of a private cloud component or an on premise computing system component.

In Example 6, the subject matter of Example 5 optionally includes the operations further comprising: detecting, by the landscape service, a first connection between the application instance and a first landscape component of the plurality of landscape components; accessing, by the landscape service, security data describing the first landscape component, the landscape score for the application instance being based at least in part on the security data describing the first landscape component.

In Example 7, the subject matter of any one or more of Examples 1-6 optionally includes the operations further comprising determining, by the access frequency service, access frequencies for the plurality of users of the first tenant, a first access frequency indicating a frequency at which a first user of the plurality of users accesses the application instance, the access frequency score being based at least in part on the first access frequency.

In Example 8, the subject matter of any one or more of Examples 1-7 optionally includes the operations further comprising: accessing, by a tenant incident service executing at the public cloud platform deployment, tenant incident data describing at least one tenant incident associated with the first tenant; and determining, by the tenant incident service, a tenant incident score for the application instance using the tenant incident data, the total risk score for the application instance also being based at least in part on the tenant incident score.

In Example 9, the subject matter of Example 8 optionally includes the tenant incident data describing a plurality of incident reports made by the plurality of users, the plurality of incident reports comprising a first incident report that was not escalated and a second incident report that was escalated.

Example 10 is a method for managing security at a public cloud platform deployment executing an application instance for a first tenant of the public cloud platform deployment, the method comprising: determining, by a landscape service executing at the public cloud platform deployment, a landscape score for the application instance, the landscape score describing a plurality of landscape components to communicate with the application instance; determining, by an access frequency service, an access frequency score for the application instance, the access frequency score based at least in part on access frequencies for a plurality of users of the first tenant; determining, by a last access service, a last access score for the application instance, the last access score based at least in part on last access times for the plurality of users; determining a total risk score for the application instance using the landscape score for the application instance, the access frequency score for the application instance, and the last access score for the application instance; and responsive to determining that the total risk score for the application instance is greater than a threshold value, sending an alert message to an administrative user account for the public cloud platform deployment.

In Example 11, the subject matter of Example 10 optionally includes writing, by the landscape service, the landscape score to a risk score record associated with the first tenant; writing, by the access frequency service, the access frequency score for the application instance to the risk score record associated with the first tenant; and writing, by the last access service, the last access score for the application instance to the risk score record associated with the first tenant.

In Example 12, the subject matter of any one or more of Examples 10-11 optionally includes responsive to determining that the total risk score for the application instance is greater than a threshold value, executing a security test of the application instance.

In Example 13, the subject matter of any one or more of Examples 10-12 optionally includes determining, by the last access service, the last access times for the plurality of users of the first tenant, a last access time for a first user of the plurality of users indicating a most recent time that the first user has accessed the application instance.

In Example 14, the subject matter of any one or more of Examples 10-13 optionally includes identifying, by the landscape service, the plurality of landscape components to communicate with the application instance, the plurality of landscape components comprising at least one of a private cloud component or an on premise computing system component.

In Example 15, the subject matter of Example 14 optionally includes detecting, by the landscape service, a first connection between the application instance and a first landscape component of the plurality of landscape components; accessing, by the landscape service, security data describing the first landscape component, the landscape score for the application instance being based at least in part on the security data describing the first landscape component.

In Example 16, the subject matter of any one or more of Examples 10-15 optionally includes determining, by the access frequency service, access frequencies for the plurality of users of the first tenant, a first access frequency indicating a frequency at which a first user of the plurality of users accesses the application instance, the access frequency score being based at least in part on the first access frequency.

In Example 17, the subject matter of any one or more of Examples 10-16 optionally includes accessing, by a tenant incident service executing at the public cloud platform deployment, tenant incident data describing at least one tenant incident associated with the first tenant; and determining, by the tenant incident service, a tenant incident score for the application instance using the tenant incident data the total risk score for the application instance also being based at least in part on the tenant incident score.

In Example 18, the subject matter of Example 17 optionally includes the tenant incident data describing a plurality of incident reports made by the plurality of users, the plurality of incident reports comprising a first incident report that was not escalated and a second incident report that was escalated.

Example 19 is a machine-readable medium comprising instructions thereon that, when executed by at least one processor, cause the at least one processor to perform operations comprising: determining, by a landscape service executing at a public cloud platform deployment, a landscape score for an application instance executing at the public cloud platform deployment for a first tenant, the landscape score describing a plurality of landscape components to communicate with the application instance; writing, by the landscape service, the landscape score to a risk score record associated with the first tenant; determining, by an access frequency service executing at the public cloud platform deployment, an access frequency score for the application instance, the access frequency score based at least in part on access frequencies for a plurality of users of the first tenant; determining, by a last access service executing at the public cloud platform deployment, a last access score for the application instance, the last access score based at least in part on last access times for the plurality of users; writing, by the last access service, the last access score for the application instance to the risk score record associated with the first tenant; determining a total risk score for the application instance using the landscape score for the application instance, the access frequency score for the application instance, and the last access score for the application instance; and responsive to determining that the total risk score for the application instance is greater than a threshold value, sending an alert message to an administrative user account for the public cloud platform deployment.

In Example 20, the subject matter of Example 19 optionally includes the operations further comprising: writing, by the landscape service, the landscape score to a risk score record associated with the first tenant; writing, by the access frequency service, the access frequency score for the application instance to the risk score record associated with the first tenant; and writing, by the last access service, the last access score for the application instance to the risk score record associated with the first tenant.

Figure 9:
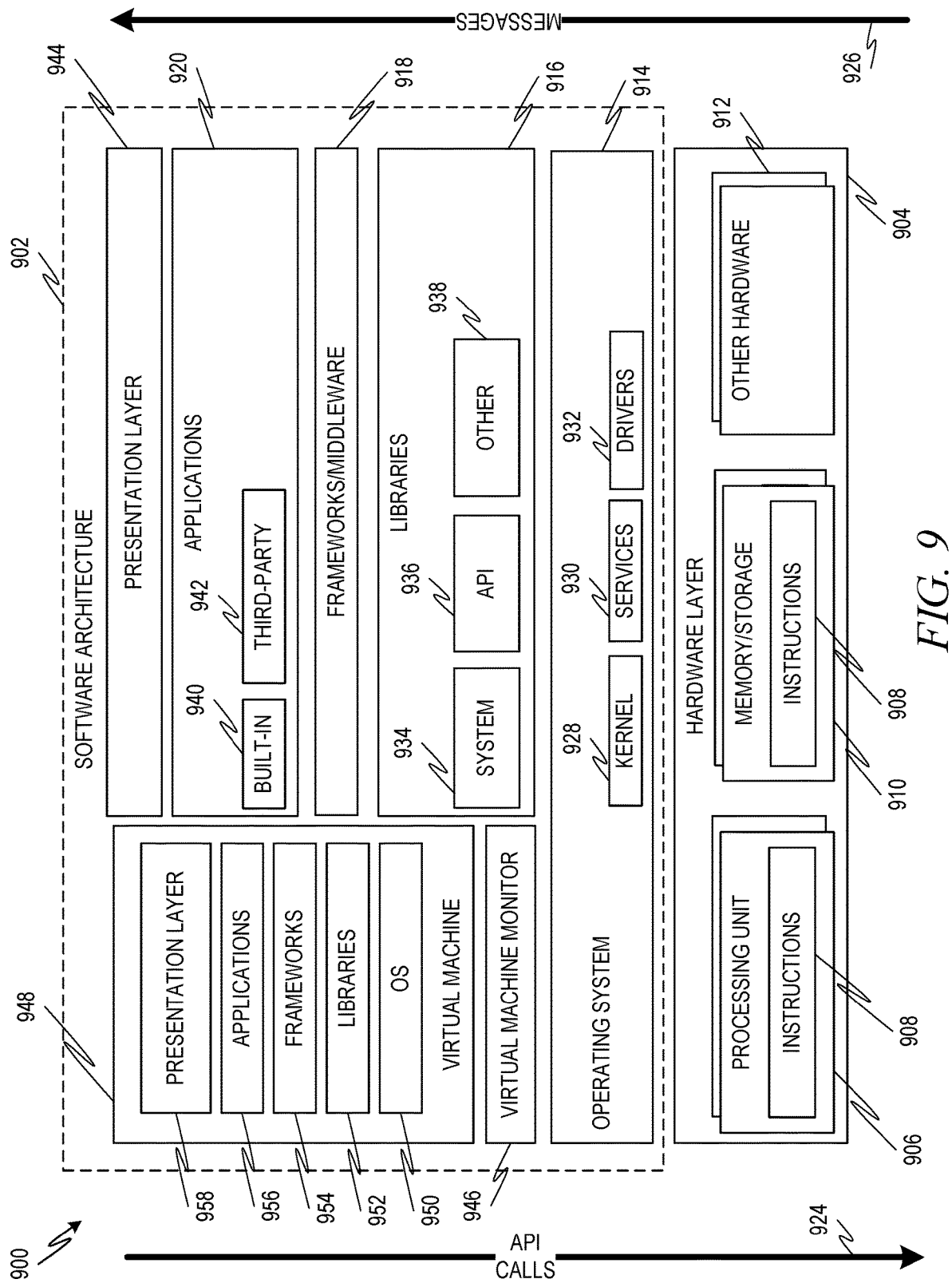
FIG. 9 is a block diagram showing one example of a software architecture for a computing device.

FIG. 9 is a block diagram 900 showing one example of a software architecture 902 for a computing device. The architecture 902 may be used in conjunction with various hardware architectures, for example, as described herein.

FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 9.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912, which represents any other hardware of the hardware layer 904, such as the other hardware illustrated as part of the architecture 902.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and presentation layer 944. Operationally, the applications 920 and/or other components within the layers may invoke API calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a median application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930, and/or drivers 932), libraries (e.g., system libraries 934, API libraries 936, and other libraries 938), and frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine 948 as well as the interface with the host operating system (i.e., operating system 914). A software architecture executes within the virtual machine 948 such as an operating system 950, libraries 952, frameworks/middleware 954, applications 956, and/or presentation layer 958. These layers of software architecture executing within the virtual machine 948 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
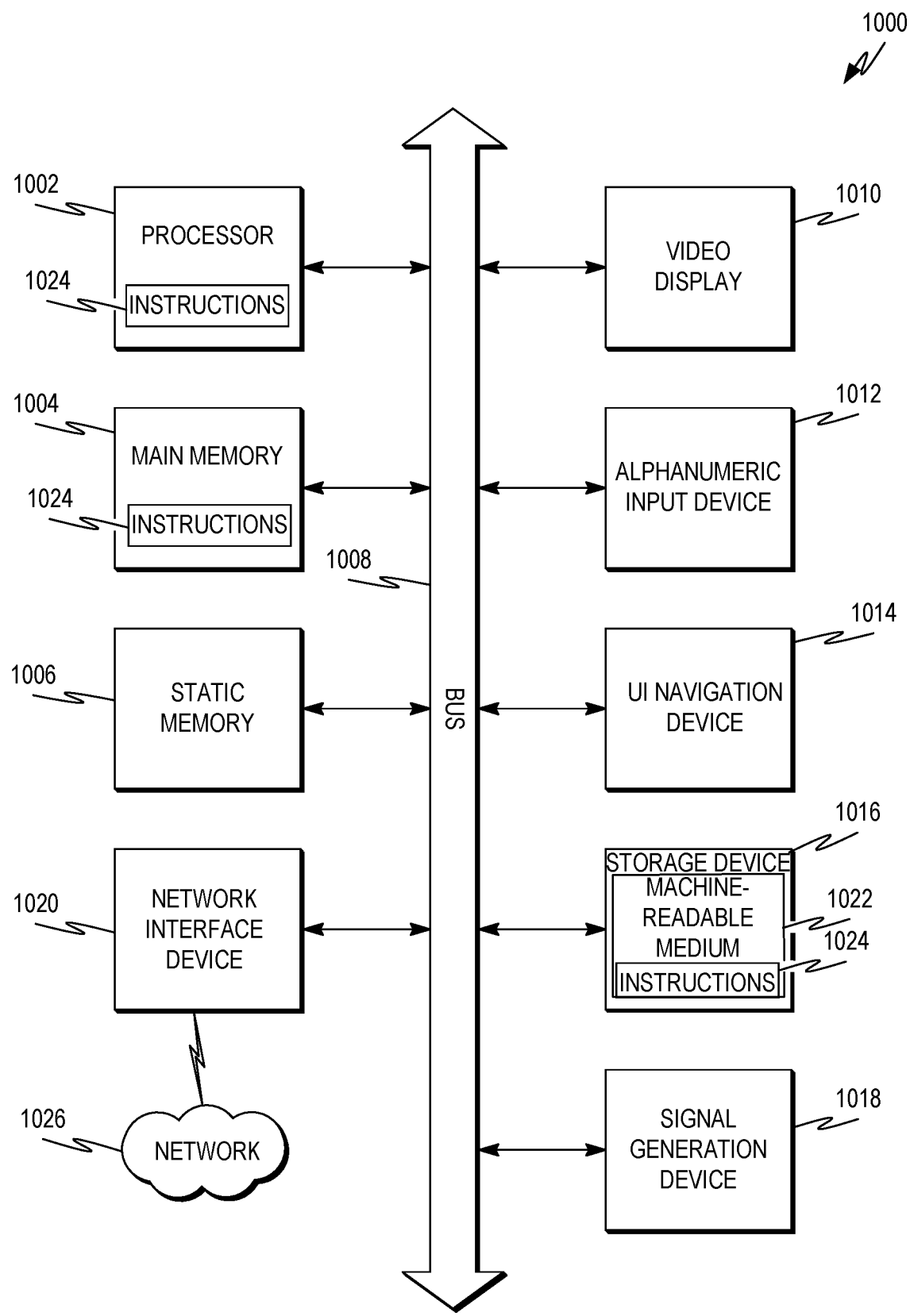
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface navigation (or cursor control) device 1014 (e.g., a mouse), a disk drive unit 1016, a signal generation device 1018 (e.g., a speaker), and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A cloud security system, comprising:
a public cloud platform deployment comprising one or more elements implemented by cloud hyperscaler hardware, the public cloud platform deployment executing an application instance for a first tenant of the public cloud platform deployment, the application instance comprising a landscape service, an access frequency service, and a last access service, the public cloud platform deployment being programmed to perform operations comprising:
determining, by the landscape service, a plurality of landscape components to communicate with the application instance, the plurality of landscape components comprising at least one of a private cloud component or an on-premise component;
determining, by the landscape service, a landscape score for the application instance, the landscape score describing the plurality of landscape components to communicate with the application instance;
determining, by the access frequency service, an access frequency score for the application instance, the access frequency score based at least in part on access frequencies for a plurality of users of the first tenant;
determining, by the last access service, a last access score for the application instance, the last access score based at least in part on last access times for the plurality of users;
determining a total risk score for the application instance using the landscape score for the application instance, the access frequency score for the application instance, and the last access score for the application instance; and
responsive to determining that the total risk score for the application instance is greater than a threshold value, sending an alert message to an administrative user account for the public cloud platform deployment.

2. The system of claim 1, the operations further comprising,
writing, by the landscape service, the landscape score to a risk score record associated with the first tenant;
writing, by the access frequency service, the access frequency score for the application instance to the risk score record associated with the first tenant; and
writing, by the last access service, the last access score for the application instance to the risk score record associated with the first tenant.

3. The system of claim 1, the operations further comprising, responsive to determining that the total risk score for the application instance is greater than a threshold value, executing a security test of the application instance.

4. The system of claim 1, the operations further comprising determining, by the last access service, the last access times for the plurality of users of the first tenant, a last access time for a first user of the plurality of users indicating a most recent time that the first user has accessed the application instance.

5. The system of claim 1, the operations further comprising:
detecting, by the landscape service, a first connection between the application instance and a first landscape component of the plurality of landscape components; and accessing, by the landscape service, security data describing the first landscape component, the landscape score for the application instance being based at least in part on the security data describing the first landscape component.

6. The system of claim 1, the operations further comprising determining, by the access frequency service, access frequencies for the plurality of users of the first tenant, a first access frequency indicating a frequency at which a first user of the plurality of users accesses the application instance, the access frequency score being based at least in part on the first access frequency.

7. The system of claim 1, the operations further comprising:
accessing, by a tenant incident service executing at the public cloud platform deployment, tenant incident data describing at least one tenant incident associated with the first tenant; and
determining, by the tenant incident service, a tenant incident score for the application instance using the tenant incident data, the total risk score for the application instance also being based at least in part on the tenant incident score.

8. The system of claim 7, the tenant incident data describing a plurality of incident reports made by the plurality of users, the plurality of incident reports comprising a first incident report that was not escalated and a second incident report that was escalated.

9. A method for managing security at a public cloud platform deployment executing an application instance for a first tenant of the public cloud platform deployment, the method comprising:
determining, by a landscape service executing at the public cloud platform deployment, a plurality of landscape components to communicate with the application instance, the plurality of landscape components comprising at least one of a private cloud component or an on-premise component;
determining, by landscape service, a landscape score for the application instance, the landscape score describing a plurality of landscape components to communicate with the application instance;
determining, by an access frequency service, an access frequency score for the application instance, the access frequency score based at least in part on access frequencies for a plurality of users of the first tenant;
determining, by a last access service, a last access score for the application instance, the last access score based at least in part on last access times for the plurality of users;
determining a total risk score for the application instance using the landscape score for the application instance, the access frequency score for the application instance, and the last access score for the application instance; and
responsive to determining that the total risk score for the application instance is greater than a threshold value, sending an alert message to an administrative user account for the public cloud platform deployment.

10. The method of claim 9, further comprising:
writing, by the landscape service, the landscape score to a risk score record associated with the first tenant;
writing, by the access frequency service, the access frequency score for the application instance to the risk score record associated with the first tenant; and writing, by the last access service, the last access score for the application instance to the risk score record associated with the first tenant.

11. The method of claim 9, further comprising, responsive to determining that the total risk score for the application instance is greater than a threshold value, executing a security test of the application instance.

12. The method of claim 9, further comprising determining, by the last access service, the last access times for the plurality of users of the first tenant, a last access time for a first user of the plurality of users indicating a most recent time that the first user has accessed the application instance.

13. The method of claim 9, further comprising:
detecting, by the landscape service, a first connection between the application instance and a first landscape component of the plurality of landscape components; and
accessing, by the landscape service, security data describing the first landscape component, the landscape score for the application instance being based at least in part on the security data describing the first landscape component.

14. The method of claim 9, further comprising determining, by the access frequency service, access frequencies for the plurality of users of the first tenant, a first access frequency indicating a frequency at which a first user of the plurality of users accesses the application instance, the access frequency score being based at least in part on the first access frequency.

15. The method of claim 9, further comprising:
accessing, by a tenant incident service executing at the public cloud platform deployment, tenant incident data describing at least one tenant incident associated with the first tenant; and
determining, by the tenant incident service, a tenant incident score for the application instance using the tenant incident data the total risk score for the application instance also being based at least in part on the tenant incident score.

16. The method of claim 15, the tenant incident data describing a plurality of incident reports made by the plurality of users, the plurality of incident reports comprising a first incident report that was not escalated and a second incident report that was escalated.

17. A non-transitory machine-readable medium comprising instructions thereon that, when executed by at least one processor, cause the at least one processor to perform operations comprising:
determining, by a landscape service executing at a public cloud platform deployment, a plurality of landscape components to communicate with an application instance executing at the public cloud platform deployment for a first tenant, the plurality of landscape components comprising at least one of a private cloud component or an on-premise component;
determining, by landscape service, a landscape score for the application instance, the landscape score describing a plurality of landscape components to communicate with the application instance;
writing, by the landscape service, the landscape score to a risk score record associated with the first tenant;
determining, by an access frequency service executing at the public cloud platform deployment, an access frequency score for the application instance, the access frequency score based at least in part on access frequencies for a plurality of users of the first tenant;

determining, by a last access service executing at the public cloud platform deployment, a last access score for the application instance, the last access score based at least in part on last access times for the plurality of users;

writing, by the last access service, the last access score for the application instance to the risk score record associated with the first tenant;

determining a total risk score for the application instance using the landscape score for the application instance, the access frequency score for the application instance, and the last access score for the application instance; and responsive to determining that the total risk score for the application instance is greater than a threshold value, sending an alert message to an administrative user account for the public cloud platform deployment.

18. The medium of claim 17, the operations further comprising:

writing, by the landscape service, the landscape score to a risk score record associated with the first tenant;

writing, by the access frequency service, the access frequency score for the application instance to the risk score record associated with the first tenant; and writing, by the last access service, the last access score for the application instance to the risk score record associated with the first tenant.

19. The medium of claim 17, the operations further comprising, responsive to determining that the total risk score for the application instance is greater than a threshold value, executing a security test of the application instance.

20. The medium of claim 17, the operations further comprising determining, by the last access service, the last access times for the plurality of users of the first tenant, a last access time for a first user of the plurality of users indicating a most recent time that the first user has accessed the application instance.

* * * * *